(12) United States Patent
Gossett (10) Patent No.: US 6,323,874 B1
(45) Date of Patent: Nov. 27, 2001

(54) SYSTEM AND METHOD FOR RENDERING AN IMAGE

(75) Inventor: Carroll Philip Gossett, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/246,136

(22) Filed: Feb. 8, 1999

(51) Int. Cl.$^7$ .................................................. G06J 11/00
(52) U.S. Cl. ........................ 345/619; 345/441; 345/621
(58) Field of Search ..................................... 345/433, 430, 345/419, 436, 473, 501, 507, 431, 619, 621; 707/6, 104; 382/235, 266

(56) References Cited

U.S. PATENT DOCUMENTS

| | | | |
|---|---|---|---|
| 5,543,935 | * 8/1996 | Harrington | 358/429 |
| 5,602,943 | * 2/1997 | Velho et al. | 382/266 |
| 5,867,166 | * 2/1999 | Myhrvold et al. | 345/419 |
| 5,903,270 | * 5/1999 | Gentry et al. | 345/419 |
| 5,963,956 | * 10/1999 | Smartt | 707/104 |
| 5,999,189 | * 12/1999 | Kajiya et al. | 345/430 |
| 6,021,406 | * 2/2000 | Kuznetsov | 707/6 |
| 6,058,211 | * 5/2000 | Bormans et al. | 382/235 |
| 6,084,595 | * 7/2000 | Bach et al. | 345/431 |

OTHER PUBLICATIONS

Voorhies, Douglas, *Graphics Gems II*, "Space–Filling Curves and a Measure of Coherence," 1991, pp. 485–486.

* cited by examiner

*Primary Examiner*—Matthew Luu
*Assistant Examiner*—Thu-Thao Havan
(74) *Attorney, Agent, or Firm*—Sterne, Kessler, Goldstein & Fox P.L.L.C.

(57) ABSTRACT

A system and method for rendering a graphic object that recursively subdivides a frame buffer into rectangular regions in an order determined by a space-filling curve. Each rectangular region is tested to determine if the region includes at least part of the object to be rendered. If it contains at least part of the object to be rendered, then the region is subdivided. In accordance with the present invention, the same tests are performed on the subdivided regions. This proceeds until the size of a subdivided rectangular region reaches a predetermined limit, whereupon the pixels in the subdivided region are rendered on a pixel-by-pixel basis.

15 Claims, 6 Drawing Sheets

SYSTEM AND METHOD FOR RENDERING AN IMAGE

FIELD OF THE INVENTION

The field of the invention is computer graphics, and particularly relates to recursively subdividing a frame buffer in an order determined by a space-filling curve to render a graphic object such as a primitive.

BACKGROUND OF THE INVENTION

In the field of computer graphics, an image is represented as a rectangular grid of picture elements. Each picture element is called a pixel. A pixel is a piece of information (data) that represents one solid color, and is stored in a part of a computer's memory called the frame buffer.

An image is displayed on a screen. An example of a screen is a cathode ray tube (CRT), which is commonly used as the display for a computer. An image is displayed on a screen by mapping the pixels stored in the frame buffer onto the screen.

An image stored as pixels in a frame buffer can be generated mathematically, i.e., as the result of mathematical calculations performed by a computer processor. An example of such a processor is an Application Specific Integrated Circuit (ASIC), which is specifically designed to efficiently and rapidly perform computer graphics functions.

The processor sends drawing instructions to an apparatus called a display controller. An example of some drawing instructions is as follows:

(1) set the fill color to red
(2) start at location 74,19 on the screen
(3) draw a square that is 15 pixels wide These drawing instructions tell the display controller to make every pixel inside the image red (1), start at a location 74 pixels from the left of the screen and 19 pixels down from the top of the screen, and then draw a square 15 pixels wide. The display controller uses these drawing instructions to set the right values for the correct pixels in the frame buffer which, when they are mapped to the screen, will produce the red square described in the drawing instructions.

A primitive is an image that can be drawn directly from drawing instructions to the frame buffer by the display controller. Primitives are typically simple shapes such as a triangle, a square, a line, a circle, a point, a regular polygon, etc. The use of primitives can facilitate the drawing of complex images to the frame buffer. Together, these primitives produce the image when the frame buffer is mapped to the screen.

The process of translating drawing instructions to pixels in a frame buffer is called rendering. In one known rendering system, the value of all of the pixels in an image are computed once for each object in the image. After the effect of a single object on all of the pixels is computed, the effect of the next object on the value of the pixels is determined. Thus, a pixel can be revisited and its value adjusted numerous times. This rendering method becomes slower as the number of objects in an image increases. An example of this type of rendering is called Z-buffering, which renders one object at a time onto the frame buffer, and thus a single pixel can be revisited many times.

Figure 1:
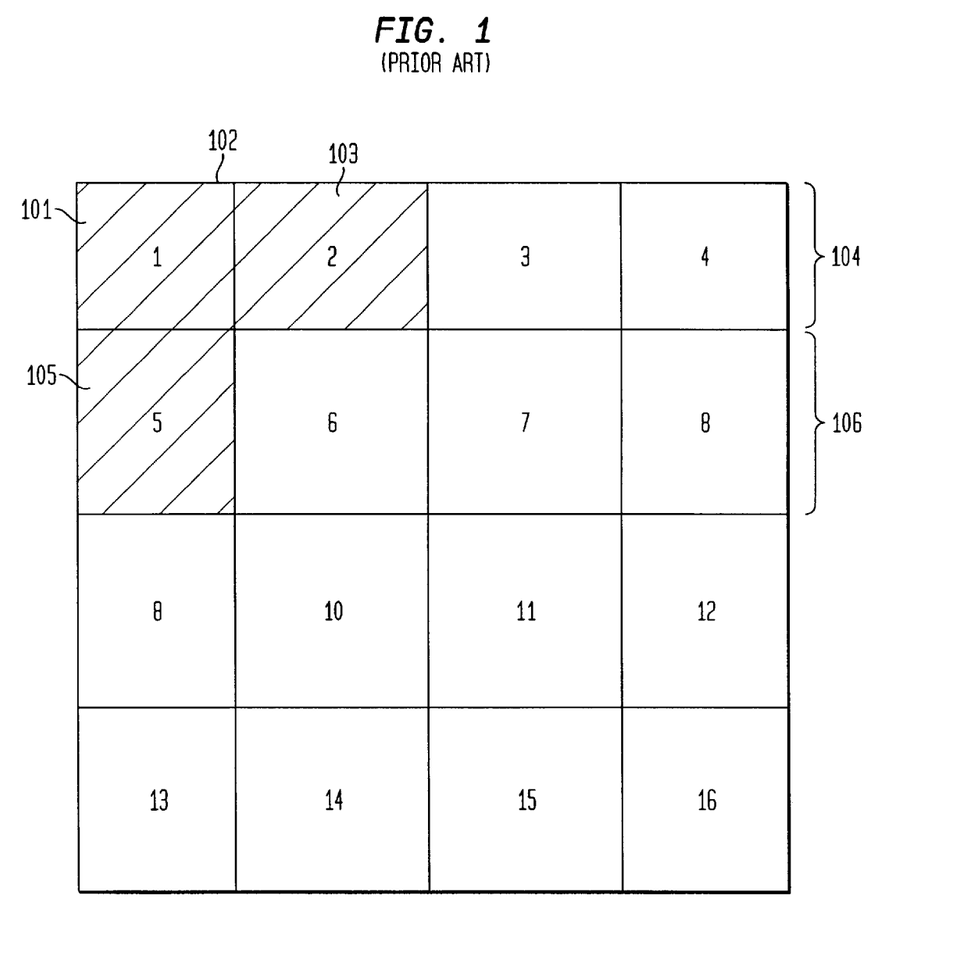
FIG. 1 shows prior art example of a pixel map.

Certain techniques render pixels without regard to the certain efficiencies that can be realized from the fact that they are part of the same object, or simply near each other within the same object. For example, in FIG. 1, pixels labeled 1, 2 and 5 are part of the same object, but the rendering technique ignores this fact, and shifts computations from pixels in this group to pixels outside the group (e.g., pixels 3 and 8), before returning to the pixels inside the object. This makes inefficient use of caches in rendering the object.

Figure 2:
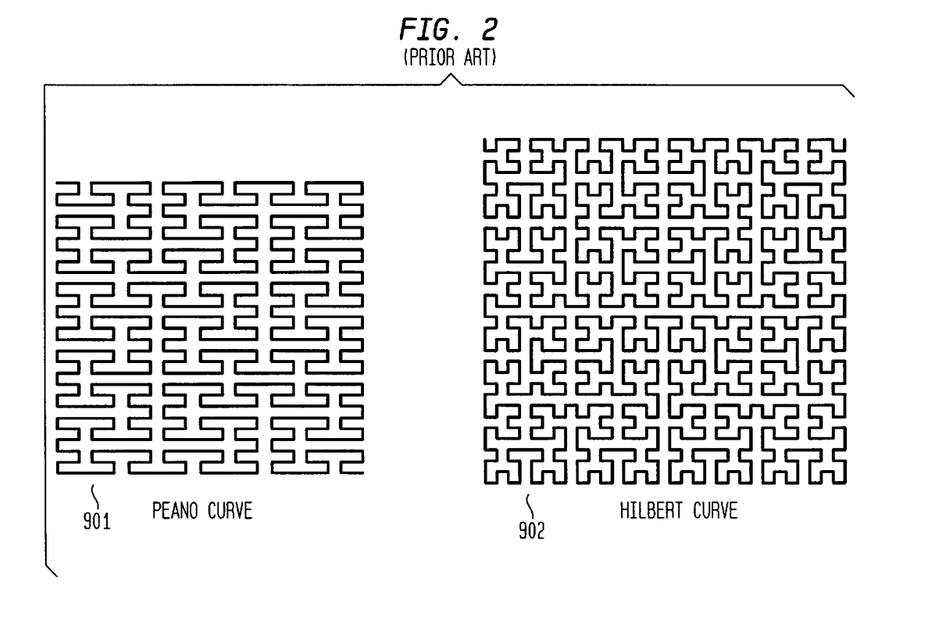
FIG. 2 shows prior art examples of a Peano curve and a Hilbert Curve.

The values of pixels that are nearby to each other in the same object can be more efficiently computed when considered together, rather than in some arbitrary fashion that ignores the fact that they are part of the same object. Certain space-filling curves (such as the Peano curve 901 and Hilbert curve 902 shown in FIG. 2) can exploit coherence in two dimensions because they are self-similar at multiple resolutions. If a space-filling curve visits all of the pixels corresponding to a particular object area at one level of resolution, then it can be presumed to have the same property for larger and smaller object areas. This suggests that space filling curves can be used recursively in a rendering scheme. A space-filling curve is topologically continuous, so the areas it visits are always adjacent to each other.

Figure 3:
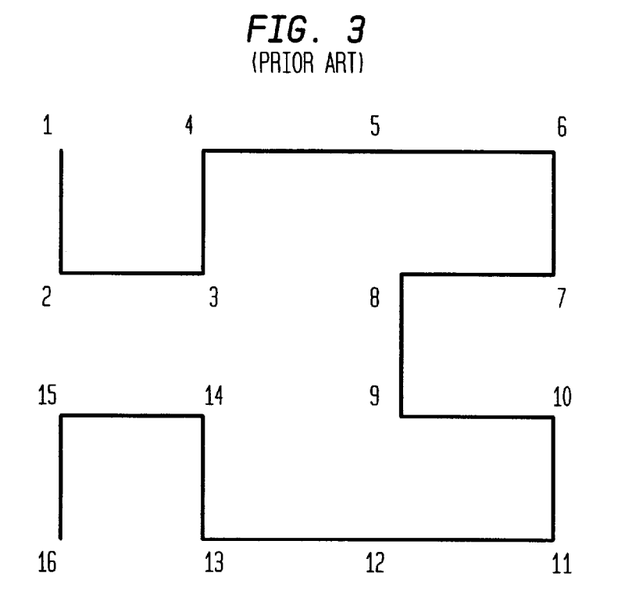
FIG. 3 shows how a Hilbert curve is used to specify the order in which pixels and/or regions are checked in a 4×4 grid.

The space-filling curve is used to determine the order in which regions or pixels are checked. As shown in FIG. 3, this order is specified by a Hilbert Curve. Pixels in an 4×4 grid are checked in the order shown by the numbers on the Hilbert Curve shown in FIG. 3.

The recursive use of space-filling curves as a traversal sequence in rendering objects is described in *Space-Filling Curves and a Measure of Coherence*, by Douglas Voorhies, Hewlett Packard Co., Chelmsford, Mass., 1991, published in *Graphics Gems II*, edited by James Arvo, Program of Computer Graphics, Cornell University, Ithaca, N.Y., Academic Press, Inc., 1991, pp. 26–30, 485–486. However, this article does not disclose how to efficiently use a recursive space-filling curve traversal sequence to render a primitive on a screen. Further, the article does not disclose any specific computational techniques at the Boolean level that can make the use of recursive space-filling curve especially efficient.

DETAILED DESCRIPTION

An embodiment of the present invention advantageously exploits the coherence of a graphic object in two dimensions by rendering the object by recursively using a space-filling curve as a traversal sequence.

Figure 4:
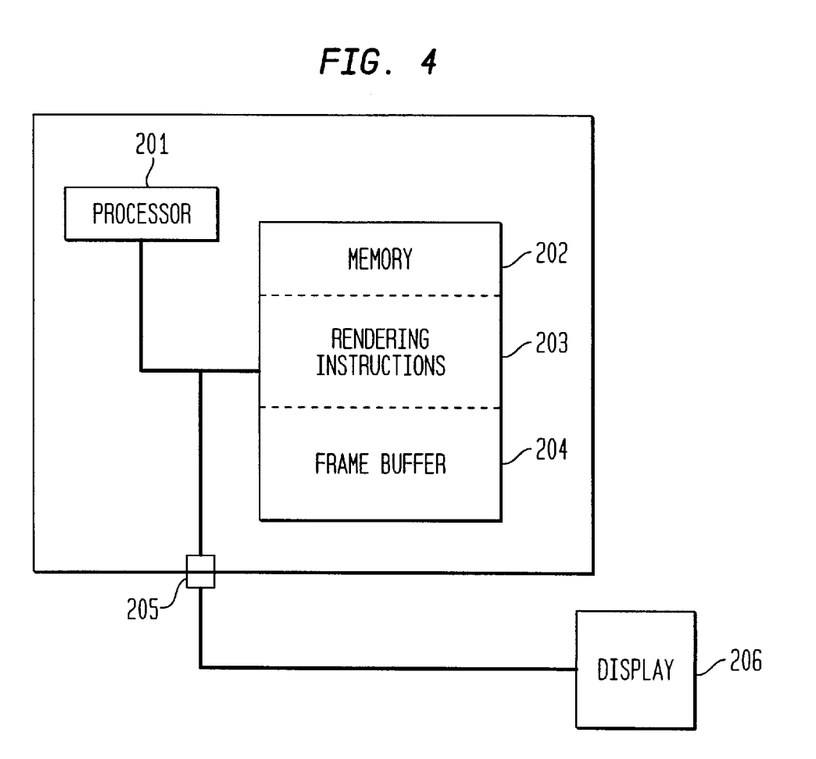
FIG. 4 shows an apparatus in accordance with an embodiment of the present invention.

An embodiment of the present invention is shown in FIG. 4. A processor 201 is coupled to a memory 202 that stores rendering instructions 203 adapted to be executed by processor 201 to render a graphic object by recursively using a space filling curve as a traversal sequence in accordance with the method of the present invention. Memory 202 also includes a frame buffer 204. Memory 202 is coupled to processor 201. The embodiment of the present invention shown in FIG. 4 also includes a port 205 adapted to be coupled to a display 206 on which the graphics rendered in accordance with the present invention are shown. Port 205 is coupled to memory 202 and processor 201.

An example of processor 201 is an ASIC (e.g., a graphics accelerator) that is manufactured to at least partly embody rendering instructions 203. In one embodiment, processor 201 is a single integrated circuit. In another embodiment, it is a plurality of integrated circuits adapted to interoperate so as to practice the method of an embodiment of the present invention. An example of a graphics acceleration systems is the Impact® graphics subsystem in the Octane® product line manufactured by Silicon Graphics, Incorporated of Mountain View, California (see <http://www.sgi.corn/octane/graphics.html, visited Jan. 25, 1998>).

Examples of memory 202 include a hard disk, Read Only Memory (ROM), Random Access Memory (RAM), a floppy disk, flash memory, and any other medium or combinations of media capable of storing digital information.

Rendering instructions 203 can be distributed in accordance with the present invention stored on a medium. Examples of a medium that store the transaction instructions adapted to be executed by processor 201 include a hard disk, a floppy disk, a Compact Disk Read Only Memory (CD-ROM), flash memory, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

Figure 5:
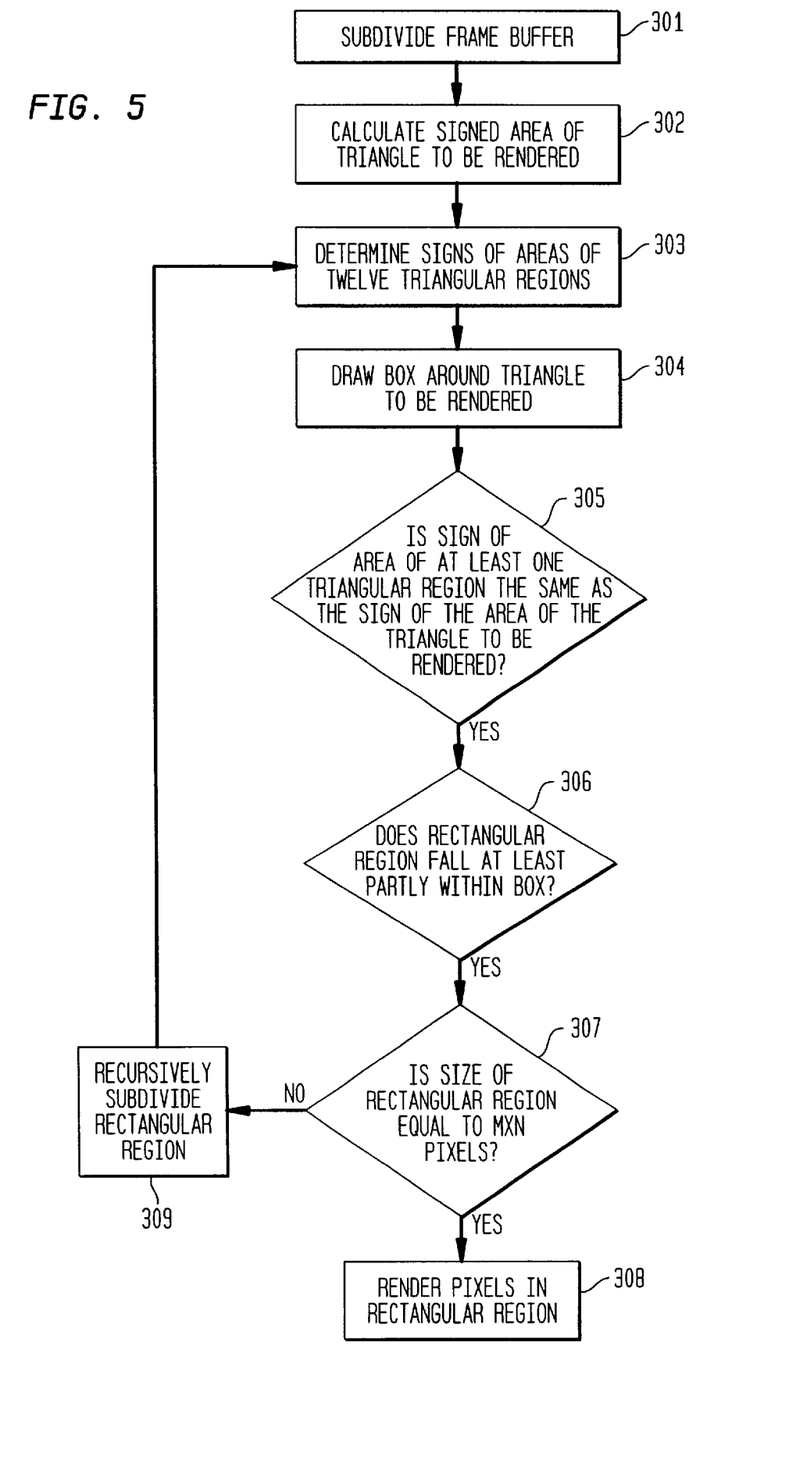
FIG. 5 shows an embodiment of the method in accordance with the present invention.
Figure 6:
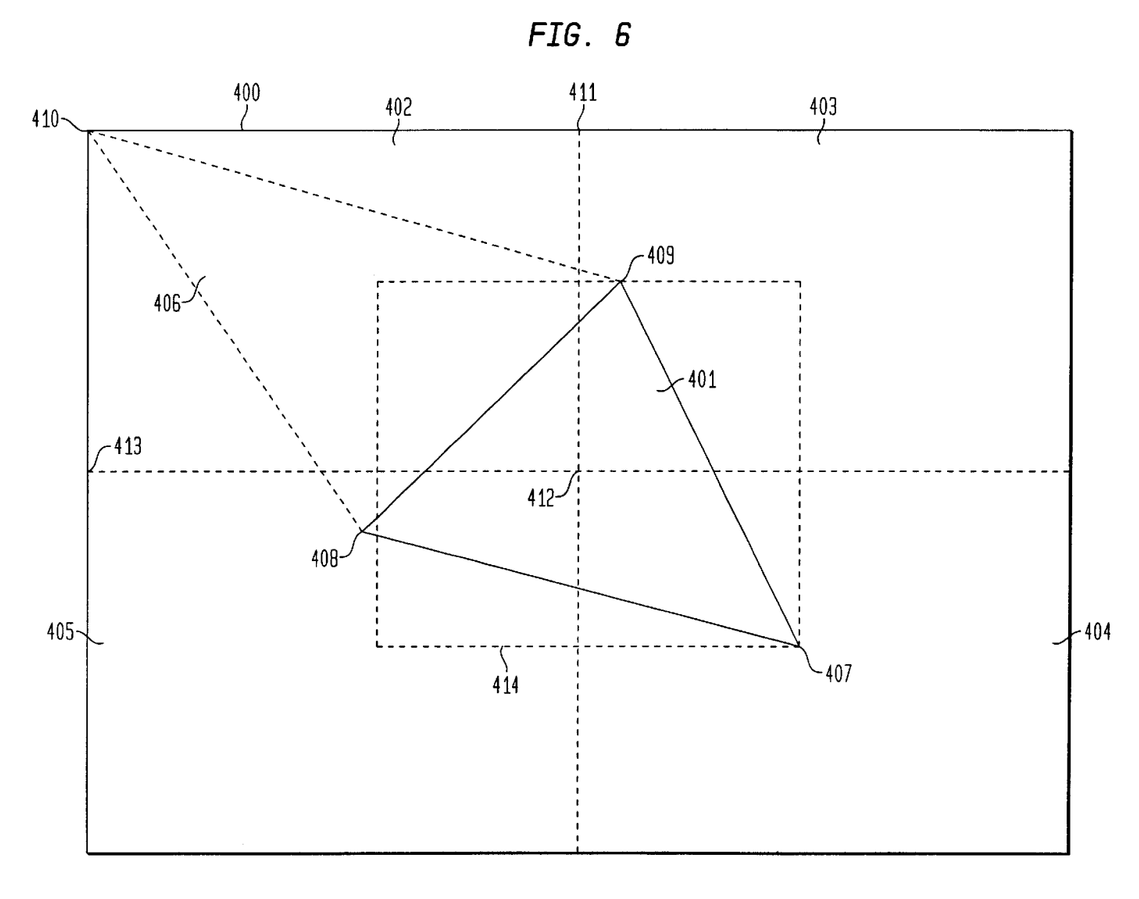
FIG. 6 shows a frame buffer subdivided in accordance with an embodiment of the present invention.

An embodiment of the method in accordance with the present invention for rendering a triangle is illustrated in the flow chart shown in FIG. 5. For the purpose of clarity, an embodiment of a frame buffer 400 with a triangle primitive 401 is shown in FIG. 6. Further for the purpose of clarity, the "triangle to be rendered" 401 will be referred to as TRIANGLE 401. The frame buffer in this embodiment is recursively subdivided into four rectangular regions. The first subdivision is shown as the four rectangular regions 402, 403, 404 and 405, step 301.

The signed area TRIANGLE 401 is calculated for each rectangular region 402, 403, 404 and 405, in an order determined by a space-filling curve, step 302. The signed area of a triangle is calculated using the triangle's coordinates. For example, consider a triangle whose vertices are defined by the coordinates $(x_a, y_a)$, $(x_b, y_b)$ and $(x_c, y_c)$. Then the signed area of the triangle is calculated using the following formula:

$$\frac{1}{2}\begin{vmatrix} x_a & y_a & 1 \\ x_b & y_b & 1 \\ x_c & y_c & 1 \end{vmatrix} = \frac{1}{2}(x_a y_b + x_b y_c + x_c y_a - y_a x_b - y_b x_c - y_c x_a) \quad (1)$$

Note that the sign of the resulting area can change by making a non-cyclic group rotation of the lines in the above determinate. This means that the same convention for the order of the coordinates should be used throughout any application of the method in accordance with the present invention. In other words, the area should be calculated using vertice values either in a clockwise direction or a counterclockwise direction from any starting vertex. The requirement is one of consistency in the signed areas—if a clockwise convention is used, it should be used throughout. Likewise for a counterclockwise convention. The general rule for polygon primitives is any cyclic rotation of the vertice values from either a clockwise or counterclockwise order is acceptable.

Although a Peano curve may be used, it can be more efficient to use a Hilbert curve in accordance with the present invention. For each rectangular region 402, 403, 404 and 405, the signed area of a triangular region (e.g., 406) defined by each distinct two vertices 407, 408 and 409 of TRIANGLE 401 and each corner (shown in FIG. 6 as 410, 411, 412 and 413 for rectangular region 402) of each rectangular region 402, 403, 404 and 405 is also calculated, to obtain twelve signed triangular region numbers, step 303. In other words, twelve triangular regions are achieved by using the vertices 407, 408 and 409 with the respective corners 410, 411, 412 and 413.

A bounding box 414 is drawn around the TRIANGLE 401, step 304, the edges of the bounding box 414 being parallel to the edges of the frame buffer. The box 414 is drawn such that each vertex of TRIANGLE 401 contacts an edge or a corner of the box.

It is then determined if for each edge of TRIANGLE 401, at least one corner 410, 411. 412, and 413 of the rectangular region 402 forms a triangle (e.g., 406) with an area of the same sign as that of the area of TRIANGLE 401, step 305. If step 305 is true, then it is further determined if the rectangular region 402 falls at least partly within the boundaries of the bounding box 414, step 306. In the embodiment shown in FIG. 6, rectangular region 402 does fall at least partly within the boundaries of bounding box 414. If step 306 is true, then it is determined if the size of the rectangular area is equal to mxn pixels, where m and n are integers, step 307. This can be carried out efficiently in accordance with the present invention if both m and n are equal to 2. In one embodiment of the present invention, if either of steps 305 or 306 is not true, then the rectangular region (e.g., 402) is not further recursively subdivided. Indeed, in one embodiment, if either step 305 or 306 is not true, then this indicates that no part of the image being rendered falls within the rectangular region being tested by these steps. If step 307 is true, then the pixels are rendered, step 308, and the rectangular region is no longer further recursively subdivided. If step 307 is not true, then the rectangular region (e.g., 402) is further recursively subdivided, step 309, and the process is repeated at the next lower level of subdivision.

In accordance with another embodiment of the present invention, the primitive to be rendered is a polygon. This embodiment of the method of the present invention is the same as the method described for rendering a triangle, with the following differences. First, the bounding box that circumscribes the polygon (analogous to box 414 in FIG. 6) is drawn so that the edges of the box are parallel to the edges of the frame buffer, and the boundaries of the box enclose the minimum area needed to entirely contain the polygon. Second, the signed areas of triangular regions (similar to region 406 in FIG. 6) are calculated for each distinct pair of vertices of the polygon. Similar conditions apply in determining whether to further subdivide or render the pixels in a subdivided rectangular region. For example, The rectangular region must fall at least partly within the region of the box around the polygon, and at least one triangular region formed by a distinct pair of vertices of the polygon and a corner of the rectangular region must be of the same sign as the area of the polygon to subdivide the rectangular region or render the pixels in the rectangular region.

Figure 7:
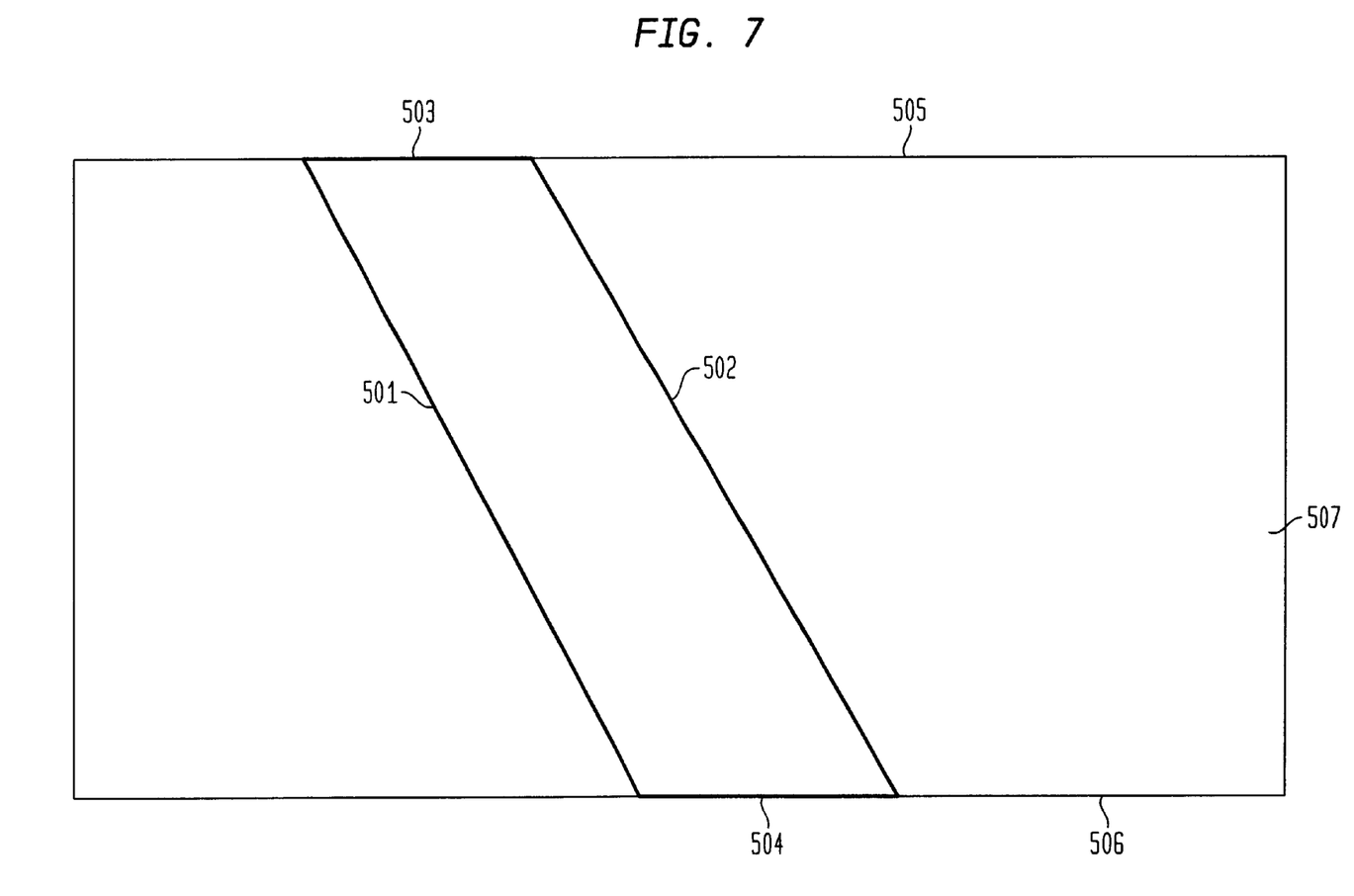
FIG. 7 shows a frame buffer that contains a segment of a line to be rendered in accordance with the present invention.

Yet another embodiment of the present invention renders a line. In actuality, a line is rendered as a quadrilateral, as it cannot be rendered as truly one dimensional. As shown in FIG. 7, the quadrilateral (line) is formed by the two parallel edges 501 and 502 and two "caps", which are edges 503 and 504 formed by the intersection of the two parallel edges 501 and 502 with the edges 505 and 506 of the frame buffer 507. The method for rendering the line is the same as that disclosed above for a polygon, where the polygon is quadrilateral.

The present invention also provides computational advantages in rendering primitives. In accordance with the present invention, only the coordinates of a single corner of each rectangular region need be passed along from one recursive level to the next. Such a corner is called a reference corner. At the next recursive level, other corners are efficiently generated from the reference corner by applying predetermined deltas in horizontal, vertical and/or diagonal directions from the reference corner. For example, if the coordinates of a reference corner are (x,y), then the coordinates of a rectangular region at the next recursive level can be computed by applying predetermined as follows:

Corner to right of reference corner=(x+A, y)

Corner below reference corner=(x, y+B)

Corner diagonally across from reference corner=(x+A, y+B)

where A is the horizontal offset and B is the vertical offset.

Further, since only the signs of the areas (e.g., of the polygon to be rendered and of the triangles formed by the edges of the polygon and the corners of the rectangular region) are needed to determine if a rectangular area should be further recursively subdivided (and eventually rendered), only the carry of the sign bits needs to be propagated. This advantageously allows the processor to ignore some of the less significant bits in the area calculations (because the value of the area is not needed in accordance with the present invention), advantageously improving the efficiency and speed with which an object is rendered.

Furthermore, since the value of the intermediate results are computed by simple addition, with only reduced-precision carry propagation for the signs, the adds can be implemented in "carry-save" form. This well-known technique allows the intermediate adds to be computed without any carry propagation, by keeping the "sum" and "carry" results of the additions separate. By this method, additions of three numbers can be reduced to a carry-save form sum and carry (two numbers) by one stage of single-bit full adders. This is both faster and uses fewer gates than a full carry-propagated add, but accomplishes the same result. Carry propagations are required only when and where the sign bits are needed. This saves significant amounts of hardware both because of the elimination of the intermediate carry propagations, and the reduced number of pipeline registers needed to ran at high clock rates.

Further optimizations can be made to reduce the precision necessary for the carry propagations. In one embodiment of the present invention, the least significant bits can be truncated. This improves efficiency at the cost of rendering the inclusion test slightly over-inclusive. When the inclusion test is slightly over-inclusive, a few unnecessary recursive subdivisions will be carried out. However, experience has shown that the additional efficiency introduced by truncating the least significant bits far outweighs the inefficiency introduced by the consequent slight over-inclusiveness of the test.

Likewise, in another embodiment, the most significant bits can be truncated in addition to the least significant bits after determining at a higher recursive level that the rectangular region at the present recursive level is entirely on one side or the other of an edge of the object to be rendered. In this embodiment, only about eight bits of precision are needed throughout the subdivision process, a substantially smaller number than that needed by known techniques. As a result, the present invention advantageously uses substantially less processing power than known techniques. Thus, the present invention can be implemented by a general purpose processor, and obviates the need for a special purpose rendering co-processor that works in tandem with the general purpose processor. This advantageously reduces the cost and complexity of implementing hardware designed to render an object.

The present invention is substantially more efficient and economical than known methods for rendering graphic objects.

What is claimed is:

1. A method for rendering a primitive, comprising the steps of:

a. subdividing a frame buffer into rectangular regions;

b. testing each rectangular region to determine if the rectangular region includes at least part of the primitive to be rendered, each rectangular region tested in an order determined by a space-filling curve;

c. if a rectangular region is determined to include at least part of the primitive to be rendered, then recursively subdividing the rectangular region, and testing each successive subdivision in an order determined by the space-filling curve to determine if the subdivision contains at least part of the primitive to be rendered; and d. if the size of a subdivided rectangular region is equal to m×n pixels, then rendering the pixels of the subdivided rectangular region if it is determined to contain at least part of the primitive to be rendered.

2. The method of claim 1, wherein only the coordinates of a single corner of each rectangular region is passed along from one recursive level to the next, and wherein at the next recursive level, other corners of a rectangular region are generated from the single corner by applying predetermined deltas in horizontal, vertical and diagonal directions from the single corner.

3. The method of claim 1, wherein adds are implemented in carry-save form.

4. The method of claim 3, wherein only the carry of the sign bits are propagated from one recursive level to the next.

5. The method of claim 3, wherein the carry-save bits are propagated only when the sign of an area is needed.

6. The method of claim 3, wherein a least significant carry-save bit is truncated.

7. The method of claim 3, further comprising the step of determining that all of the pixels contained in a rectangular region are entirely on one side of an edge of an object to be rendered, and further comprising the step of truncating a most significant carry-save bit.

8. A method for rendering a triangle having three vertices, comprising the steps of:

a. recursively subdividing a frame buffer into four rectangular regions, each rectangular region having four corners, b. for each rectangular region in an order determined by a space-filling curve:

i. calculating the signed area of the triangle to be rendered;

ii. calculating the signed area of a triangular region defined by two vertices of the triangle to be rendered and a corner of the rectangular region, for each distinct pair of vertices of the triangle to be rendered, and for each of the four corners of the rectangular region, to obtain twelve signed triangular region numbers;

iii. determining if the rectangular region falls at least partly within the boundaries of a box with four corners and four edges drawn around the triangle to be rendered, the edges of the box being parallel to the edges of the frame buffer, and the box being drawn such that each vertex of the triangle to be rendered contacts an edge or a corner of the box;

c. if for each edge of the triangle to be rendered, at least one corner of the rectangular region forms a triangle with an area of the same sign as the triangle to be rendered, and if the rectangular region falls at least partly within the boundaries of the box, then recursively subdividing the rectangular region until the size of the rectangular region is equal to mxn pixels, m and n being integers;

d. when the size of the rectangular region is equal to mxn pixels, then rendering the pixels;

e. if one or more edges of the triangle to be rendered form triangles with all four corners of the rectangular region with areas of opposite sign to the triangle to be rendered, or if no part of the rectangular region lies within the boundaries of the box, then stopping to recursively subdivide the rectangular region.

9. A method for rendering a polygon, comprising the steps of:

a. recursively subdividing a frame buffer into four rectangular regions, each rectangular region having four corners, b. for each rectangular region in an order determined by a space-filling curve:
   i. calculating the signed area of the polygon to be rendered;
   ii. calculating the signed area of a triangular region defined by two vertices of the polygon to be rendered and a corner of the rectangular region, for each distinct pair of vertices of the polygon to be rendered, and for each of the four corners of the rectangular region;
   iii. determining if the rectangular region falls at least partly within the boundaries of a box with four corners and four edges drawn around the polygon to be rendered, the edges of the box being parallel to the edges of the frame buffer, and the box being drawn such that the boundaries of the box enclose the minimum area needed to entirely contain the polygon therein;

c. if for each edge of the polygon to be rendered, at least one corner of the rectangular region forms a triangle with an area of the same sign as the polygon to be rendered, and if the rectangular region falls at least partly within the boundaries of the box, then recursively subdividing the rectangular region until the size of the rectangular region is equal to mxn pixels, m and n being integers;

d. when the size of the rectangular region is equal to mxn pixels, then rendering the pixels;

e. if one or more edges of the polygon to be rendered form triangles with all four corners of the rectangular region with areas of opposite sign to the polygon to be rendered, or if no part of the rectangular region lies within the boundaries of the box, then stopping to recursively subdivide the rectangular region.

10. A method for rendering a line represented as a quadrilateral with two parallel edges, comprising the steps of:

a. recursively subdividing a frame buffer into four rectangular regions, each rectangular region having four corners, b. for each rectangular region in an order determined by a space-filling curve:
   i. enclosing the line in a bounding box, the bounding box having four corners and four edges, the edges of the box being parallel to the edges of the frame buffer, and the box being drawn such that the boundaries of the box enclose the minimum area needed to entirely contain that portion of the line that falls within the frame buffer, the bounding box forming an end edge of the line where the line intersects the bounding box;
   ii. calculating the signed area of the quadrilateral formed by the two parallel edges of the line and the end edges of the line;
   iii. calculating the signed area of a triangular region defined by two vertices of the quadrilateral and a corner of the rectangular region, for each distinct pair of vertices of the quadrilateral, and for each of the four corners of the rectangular region;
   iv. determining if the region falls at least partly within the bounding box;

c. if for each edge of the quadrilateral, at least one corner of the rectangular region forms a triangle with an area of the same sign as the quadrilateral, and if the rectangular region falls at least partly within the boundaries of the box, then recursively subdividing the rectangular region until the size of the rectangular region equal mxn pixels, m and n being integers;

d. when the size of the rectangular region is equal to mxn pixels, then rendering the pixels;

e. if one or more edges of the quadrilateral form triangles with all four corners of the rectangular region having areas of opposite sign to the triangle to be rendered, or if no part of the rectangular region lies within the boundaries of the box, then stopping to recursively subdivide the rectangular region.

11. An apparatus for rendering a polygon, comprising:

a. a processor;

b. a memory that stores rendering instructions adapted to be executed on said processor to recursively subdivide a frame buffer into rectangular regions, and for each rectangular region in an order determined by a space-filling curve, calculate the signed area of the polygon to be rendered, calculate the signed area of a triangular region defined by two vertices of the polygon to be rendered and a corner of the rectangular region, for each distinct pair of vertices of the polygon to be rendered, and for each of the four corners of the rectangular region, determine if the region falls at least partly within the boundaries of a box with four corners and four edges drawn around the polygon to be rendered, the edges of the box being parallel to the edges of the frame buffer, and the box being drawn such that the boundaries of the box enclose the minimum area needed to entirely contain the polygon therein, and if for each edge of the polygon to be rendered, at least one corner of the rectangular region forms a triangle with an area of the same sign as the polygon to be rendered, and if the rectangular region falls at least partly within the boundaries of the box, then recursively subdivide the rectangular region until the size of the rectangular region is equal to mxn pixels, m and n being integers, and when the size of the rectangular region is equal to mxn pixels, then to render the pixels, while if one or more edges of the polygon to be rendered form triangles with all four corners of the rectangular region with areas of opposite sign to the polygon to be rendered, or if no part of the rectangular region lies within the boundaries of the box, then to stop recursively subdividing the rectangular region, said memory coupled to said processor.

12. The apparatus of claim 11, further comprising a port adapted to be coupled to a display, said port coupled to said memory and said processor.

13. The apparatus of claim 11, further comprising a display on which the pixels are rendered.

14. An apparatus for rendering a primitive, comprising:
   a. a processor; and
   b. a memory that stores rendering instructions adapted to be executed on said processor to subdivide a frame buffer into rectangular regions, test each rectangular region to determine if the rectangular region includes at least part of the primitive to be rendered, each rectangular region being tested in an order determined by a space-filling curve, and if a rectangular region includes at least part of the primitive to be rendered, then to recursively subdivide the rectangular region, test each successive subdivision in an order determined by the space-filling curve to determine if the subdivision contains at least part of the primitive to be rendered, and if the size of a subdivision is less than mxn pixels, then to render the subdivision if it is determined to contain at least part of the primitive to be rendered, said memory coupled to said processor.

15. A system for rendering a polygon, comprising:
   a. means for recursively subdividing a frame buffer into four rectangular regions, each rectangular region having four corners,
   b. means for, in an order determined by a space-filling curve, calculating the signed area of the polygon to be rendered, calculating the signed area of a triangular region defined by two vertices of the polygon to be rendered and a corner of the rectangular region, for each distinct pair of vertices of the polygon to be rendered, and for each of the four corners of the rectangular region, and determining if the region falls at least partly within the boundaries of a box with four corners and four edges drawn around the polygon to be rendered, the edges of the box being parallel to the edges of the frame buffer, and the box being drawn such that the boundaries of the box enclose the minimum area needed to entirely contain the polygon therein;
   c. means for determining if for each edge of the polygon to be rendered at least one corner of the rectangular region forms a triangle with an area of the same sign as the polygon to be rendered
   d. means for determining if the rectangular region falls at least partly within the boundaries of the box;
   e. means for recursively subdividing the rectangular region until the size of the rectangular region is equal to mxn pixels, m and n being integers;
   f. means for rendering the pixels of the rectangular area when the size of the rectangular region is equal to mxn pixels;
   g. means for determining if one or more edges of the polygon to be rendered form triangles with all four corners of the rectangular region with areas of opposite sign to the polygon to be rendered; and
   h. means for determining if no part of the rectangular region lies within the boundaries of the box.

* * * * *